United States Patent Office 3,755,387
Patented Aug. 28, 1973

3,755,387
VAPOR PHASE TRANSVINYLATION PROCESS
Arnold E. Young, Midland, Mich., assignor to The
Dow Chemical Company, Midland, Mich.
No Drawing. Filed Aug. 5, 1969, Ser. No. 847,740
Int. Cl. C07c 67/02; C11c 3/10
U.S. Cl. 260—410.9 N                    9 Claims

ABSTRACT OF THE DISCLOSURE

A transvinylation process which comprises reacting by contacting, in the presence of a noble metal salt catalyst and in the vapor phase at reaction temperature, and acid and a vinyl ester.

BACKGROUND OF THE INVENTION

Transvinylation reactions are well known in the art. Usually these reactions are carried out batchwise in the liquid phase at about room temperature, utilizing palladium salt catalysts alone, or mercuric salts and a strong acid, as the catalyst. The art has been troubled, however, with separating the reaction products from the halide or strong acid catalyst.

SUMMARY OF THE INVENTION

The instant invention is a transvinylation process which comprises reacting by contacting, in the presence of a catalyst and in the vapor phase at reaction temperature, an organic acid with a vinyl ester.

The vapor phase transvinylation reaction of this invention has several advantages over the liquid phase reactions of the prior art. Among these are elimination of problems associated with catalyst recovery and neutralization of strong acid catalysts. Also, it has been found that a mercury salt alone can be utilized as the catalyst, without the necessity of a strong acid.

More particularly, the acids which are suitable for the process of this invention include those of the formula R'—COOH, wherein R' may be an alkyl group of up to about 8 carbon atoms, such as methyl, propyl, pentyl and heptyl; cycloalkyl groups, such as cyclopropyl, cyclobutyl, cyclopentyl and cyclohexyl; phenyl; phenylalkyl groups of from 7 to about 9 total carbon atoms, such as benzyl, phenylethyl and phenylpropyl; tolyl; and halo- and polyhalo-substituted derivatives of the above, such as chlorobutyl, dibromohexyl, chlorocyclobutyl, dibromophenyl, bromophenylethyl and dichlorotolyl.

Representative acids include propionic and butyric acids; benzoic acid; phenylacetic and phenylbutyric acids; o-, m- and p-toluic acids; trichloroacetic acid; 4-bromooctanoic acid; 3-bromocyclobutanecarboxylic acid; p-chlorobenzoic acid; 2-(2,4-dichlorophenyl)butyric acid; and m-bromo-p-toluic acid.

The esters suitable for the process of this invention include those of the formula $CH_2=CH—OCO—R$, wherein R is of the same class as R' above utilized for defining the acids, although of a different species for any particular reaction. Vinyl acetate and vinyl propionate are preferred due to their availability.

The catalysts which can be utilized include salts of the metals Hg, Pd, Pt, Ir, Rh, Ru and Os. Halides, sulfates, nitrates, oxides, cyanides, phosphates and carboxylates, such as acetates, propionates and benzoates, are suitable. Hg and Pd are preferred metals.

The above catalysts can be used alone, or in conjunction with those metals known to promote the reoxidation of the catalyst and oxygen or atmospheric air. Such promoters include Fe, Cu, Sn and salts thereof, the anions of such salts being the same as those enumerated for salts of the above metal catalysts.

It is to be noted that the catalysts will eventually lose their effect over a period of reaction time. This may be substantially delayed by feeding oxygen or air with the reactants, or by regenerating the catalyst separately with $O_2$ or air.

The catalysts can be supported on any suitable support, such as activated carbon, silica gel, alumina or molecular sieves. The catalysts are prepared by standard impregnation techniques.

The reaction temperature and pressure must be such that the reactants are in the vapor phase as they contact the catalyst. The lower reaction temperature is limited by the vapor pressure of the reactants. A temperature of 75° C. is generally suitable. If the temperature is maintained too low and liquid reactant allowed to contact the catalyst, it tends to wash it away. The upper reaction temperature, on the other hand, is limited only by that point at which one or both of the esters degrade, 225° C. being suitable. The preferred temperature range is 100° to 175° C.

It is to be noted that temperatures below the normal boiling point of the reactants can be used if the reaction is carried out at reduced pressure.

The molar ratio of the reactants is not critical, as the exchange will occur at any ratio. However, the exchange is optimized when the mole ratio is near one to one, and is preferably 0.5 to 2 moles of ester per mole of acid.

A diluent, such as nitrogen, helium, argon, krypton or neon may be utilized to adjust the space velocity, as defined below.

A catalytic amount of catalyst is sufficient, generally from 0.1 to 20 weight percent of metal ion on support, preferably 1 to 10 weight percent. The same is true of the reoxidation promoter metal, if utilized.

From 2.5 to 10 molar percent of oxygen, based on total reactants and fed therewith, may be utilized to reoxidize the catalyst.

Overall space velocities (moles of total feed gas per hour per liter of catalyst) of up to about 100 may be utilized for the reactants, and oxygen if utilized, while space velocities of 5 to about 20 are preferred.

SPECIFIC EMBODIMENTS 75 ml. of acetic acid (1.29 mole) and 15 ml. of vinyl propionate (0.09 mole) were fed, at a rate of 14.4 ml./hr. from a 100 cc. syringe using a syringe pump, and $N_2$ (49 ml./min.) and $O_2$ (10 ml./min.), flow rates were controlled by rotameters. The reactants, after vaporization, and diluent were preheated to about 200° C. in a 1" i.d. x 4" long Pyrex tube packed with Beryl saddles. The reactants were then led to a vertical 2" i.d. x 24" long silica glass reaction tube heated by an electric furnace with the temperature monitored by 8 thermocouples. 50 ml. of catalyst was used in all cases.

The effluent was first led to a water-cooled condenser, and then to an ice-water cold trap. Analysis was by gas chromatography. Table I lists the details of a series of such experiments. Transvinylation of an aromatic acid, such as benzoic acid, and a vinyl ester also yields satisfactory results.

TABLE I

| Run | Catalyst | Wt. percent metal ion | T, °C. | Time, hrs.ᵃ | Vinyl acetate | Vinyl propionate |
|---|---|---|---|---|---|---|
| 1 | Carbon | | 175 | 5.0 | 0 | 100 |
| 2 | Pd on carbon | 1 | 110 | 8.5 | 90.5 | 9.5 |
| 3 | Cu on carbon | 3.3 | 110 | 4.7 | 0.6 | 99.4 |
| 4 | Fe on carbon | 1 | 110 | 4.0 | 0.2 | 99.8 |
| 5 | Pd/Cu on carbon | 1:1 | 120 | 0-5 | 90 | 10 |
| 6 | do | 1:1 | 145 | 10 | 90 | 10 |
| 7 | do | 1:1 | 175 | 15 | 92 | 8 |
| 8 | Pd/Cu/Fe ob SiO₂ | 0.9/3.3/1 | 120 | 20 | 88 | 12 |
| 9 | Hg(OAc)₂ on carbon | 2 | 105 | 0.5.5 | 53 | 47 |
| 10 | do | 2 | 140 | 11.5 | 86 | 14 |
| 11 | HgCl₂ on carbon | 2 | 125 | 0-5 | 88.3 | 11.7 |
| 12 | do | 2 | 150 | 10.3 | 89.6 | 10.4 |
| 13 | do | 2 | 175 | 15.3 | 88.8 | 11.2 |
| 14 | Hg(OAc)₂ on carbon | 5 | 125 | 0-5 | 90 | 10 |
| 15 | do | 5 | 150 | 10 | 91 | 9 |
| 16 | do | 10 | 125 | 0-5 | 90 | 10 |
| 17 | do | 10 | 150 | 10 | 91 | 9 |
| 18 | do | 10 | 175 | 10-15 | 92-87 | 8-13 |
| 19 | HgCl₂ on carbon | 10 | 125 | 0-5 | 92 | 8 |
| 20 | do | 10 | 155 | 10 | 91 | 9 |
| 21 | do | 10 | 175 | 15 | 94 | 6 |
| 22 | Pt/Cu on carbon | 0.9/1.7 | 125 | 0-5 | 25 | 75 |

ᵃ The accumulated time catalyst was used reading from top to bottom for a single catalyst.

I claim:

1. A vapor phase transvinylation process which comprises reacting by contacting, in the vapor phase at 100° to 225° C. and in the presence of a Hg, Pd, Pt, Ir, Rh, Ru or Os salt catalyst, an acid of the formula R'—COOH, and a vinyl ester of the formula CH$_2$=CH—OCO—R, wherein, in each formula, each of R and R' is a different alkyl group of up to about 8 carbon atoms, a cycloalkyl group of from 3 to 6 carbon atoms, phenyl, phenylalkyl group of from 7 to 9 total carbon atoms, methylphenyl, and halo- and polyhalo-substituted derivatives thereof.

2. The process of claim 1 wherein the catalyst contains, as a reoxidation promoter, Fe, Cu or Sn ions.

3. The process of claim 1 wherein 2.5 to 10 mole percent oxygen is fed to the reaction zone with the reactants in order to reoxidize the catalyst.

4. The process of claim 1 wherein the reactants are fed to the reaction at a space velocity of up to about 100.

5. The process of claim 4 wherein the space velocity is from 5 to about 20.

6. The process of claim 1 wherein the vinyl ester is vinyl acetate or vinyl propionate.

7. The process of claim 1 wherein the catalyst is a salt of Hg or Pd.

8. The process of claim 1 wherein the catalyst is a halide, sulfate, nitrate, cyanide, phosphate, acetate, propionate or benzoate.

9. The process of claim 1 wherein each of R and R' is an alkyl group of up to 8 carbon atoms, phenyl, phenylalkyl group of 7 to 9 carbon atoms or methylphenyl and R differs from R'.

References Cited

UNITED STATES PATENTS

| | | | |
|---|---|---|---|
| 2,931,819 | 4/1960 | Mayne et al. | 260—491 |
| 3,188,319 | 6/1965 | Smidt et al. | 260—491 |
| 3,221,045 | 11/1965 | McKeon et al. | 260—497 |

VIVIAN GARNER, Primary Examiner

U.S. Cl. X.R.

260—408, 468 R, 476 R, 487, 491